Allen, Rouse & Melcher
Oil Pump

N° 51,990. Patented Jan. 9, 1866.

Witnesses.

Inventors.
M. N. Allen
Jas Rouse
Jas Melcher

UNITED STATES PATENT OFFICE.

MARINUS N. ALLEN AND JOSEPH ROUSE, OF TITUSVILLE, PENNSYLVANIA, AND JAMES MELCHER, OF WATERBURY, CONNECTICUT.

IMPROVEMENT IN PACKING PUMP-PISTONS.

Specification forming part of Letters Patent No. 51,990, dated January 9, 1866.

*To all whom it may concern:*

Be it known that we, MARINUS N. ALLEN and JOSEPH ROUSE, both of Titusville, in the county of Crawford and State of Pennsylvania, and JAMES MELCHER, of Waterbury, in the county of New Haven and State of Connecticut, have invented a new and useful Improvement in Pumps; and we do hereby declare that the following is a full, clear, and exact description thereof, which will enable those skilled in the art to make and use the same, reference being had to the accompanying drawings, forming a part of this specification, in which—

Figure 1:
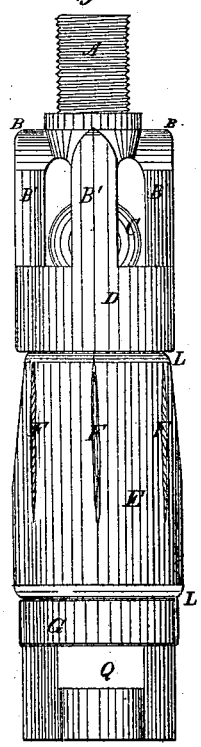
Figure 2:
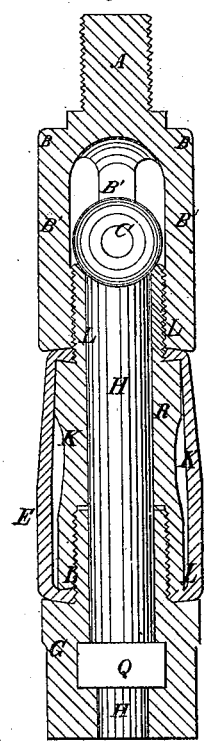
Figure 3:
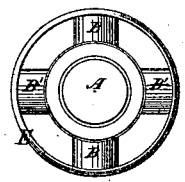
Figure 4:
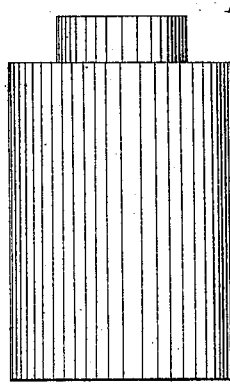
Figure 5:
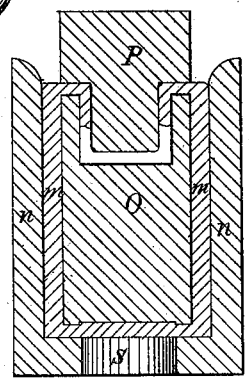

Figure 1 is a peripherical view of a piston made according to our invention. Fig. 2 is an axial section thereof. Fig. 3 is a top view. Figs. 4 and 5 are given for the purpose of illustrating how the packing of the piston, if made of leather, may be crimped.

Similar letters of reference indicate like parts.

This invention consists in a new mode of packing pistons, the packing, in the shape of a hollow cylinder, being placed around the piston and securely fixed at top and bottom, such cylindrical packing being slitted to allow the fluid or liquid in the pump-cylinder to enter an annular space between the sides of the piston and the packing, whereby the packing is expanded on the ascent of the piston, and on the descent of the piston is collapsed, because the water is then forced out of such annular space into the pump-cylinder.

It also consists in so shaping the top of the piston that small pieces of metal and other matters which may fall into the pump-tube cannot obstruct the pump by lodging between the wall of the tube and the piston, as is often the case with pistons of ordinary construction.

The illustration here given of our invention consists of a piston suitable to be used in deep wells, such as oil-wells with a single-action pump; but our invention is applicable to all kinds of pumps, and to pistons of various forms and constructions.

A designates the neck, by means of which the piston is secured to the piston-rod. Below the neck is a cage for the valve C, the bars B' of the cage being united below with the hollow cylindrical body D, which is united by a screw-joint with the hollow neck of the middle part, R, of the piston. The higher parts of the bars B' are each brought up to a square shoulder, B, thereby effecting a great change in the shape of the upper part of the piston, as compared with the ordinary construction, in which such upper parts are either rounded off or else brought to a tapering or conical form, so as to leave a triangular space all around the top of the piston, in which pieces of metal and other foreign substances which may fall into the tube will become wedged, and so prevent the working of the pump as well as the withdrawal of the piston. With our construction—that is, deepening the tops B of the bars B', so as to fill the space between the neck of the piston and the sides of the tube or cylinder—such accidents and obstructions cannot happen, because there is no vacant space left between the outsides of the bars and the wall of the cylinder or well-tube.

The body D of the cage of the valve is united to the hollow neck of middle piece, R, by a screw-joint, and the lower end of this middle piece is connected to the bottom piece, G, of the piston in the same manner. The pieces or sections G R, which make up the lower portion of the piston, are hollow, thus forming a central passage, H, throughout that part of the piston at the top of which—that is, on the end of the neck of the middle piece, R—is the seat of the valve C. The lower piece, G, of the piston has a horizontal passage, Q, through its sides, which passage intersects the axial passage H. The diameter of the middle section, R, is less than the diameters of the section G and ring D, and its sides are made concave for a little space about the middle of its length. In this example we have applied the packing of the piston around this middle section, R, and have therefore reduced its diameter, as above stated.

The packing E may be made of leather, rubber, gutta-percha, or other suitable substance, or it may be of any thin metal which possesses sufficient elasticity. In this example we have shown a leather packing, E, made of one piece and crimped into the form of a hollow cylinder. When we use a leather packing we prefer to crimp it into the form required, because by that means we can impart to it greater strength and consistency, so that it will better endure the action of liquids and abrasion of the sides of the pump tube and cylinder.

Figs. 3 and 4 are drawn to show how the leather blank may be crimped; but this device for crimping does not form any part of our invention.

N is a socket-die having a central perforation, S, through its bottom, the diameter of which perforation should be equal to the diameter of the neck of section G of the piston.

O is a central die, of a diameter equal to the greatest diameter of section R of the piston, having a counter-die formed on its top.

The leather M is forced into the socket-die N by means of pressure applied to the block or die O, and the edges of the leather are then compressed and crimped between the upper die, P, and the upper face of the central block, O. The bottom of the leather cylinder thus formed may be punched out through the perforation S, or it may be cut out after its removal from the crimping apparatus. The top and bottom edges of the leathern cylinder are next prepared, and shaped so that they will fit around the piston and become secured thereto at the points L L, between the shoulders of the ring D and middle section, R, and of the bottom section, G, and middle section, R, respectively.

The upper part of the packing-cylinder E has four or more slits, F, cut through it, extending from near its top joint to or beyond the middle of its length, to allow fluids and liquids to enter the annular space $k$ between the part R of the piston and the packing-cylinder. When the piston is rising fluids and liquids in the cylinder will rush through the slits F into the space K and force the lower part of the packing-cylinder E outward, thereby "packing" the space between the piston and the cylinder. When the piston is descending the fluids or liquids will be expelled from said space K and allow the easy movement of the piston in the cylinder and pump-tube.

A screw-thread may be tapped in the lower end of the piston in the perforation H of the section G, so as to enable us to screw the section onto the spindle of the pump valve, and thereby enable us to withdraw that valve from the pump-tube when it is necessary to take it out for repairs.

The outer edges of the ordinary cup-valve, which is in common use in oil and other wells, are continually liable to be forced into the joints of the tubing, and to become so fixed therein as to cause great difficulty in withdrawing the piston, whereby oftentimes the piston-rod is parted by the force applied to extricate the piston. Our invention removes this difficulty, because the upper part of the valve—that is, the cylinder E—is confined between the shoulders of the ring D and middle section, R, so that a smooth unbroken surface is presented on all parts of the valve, whereby it is enabled to pass the joints of the tube without becoming wedged or jammed therein.

We claim as new and desire to secure by Letters Patent—

1. In the described combination with a pump-piston, the expanding packing E, confined at its ends in the manner described, so as to avoid any external edge projecting at right angles to the motion of the shaft.

2. Packing the pistons of pumps by means of a cylinder confined both at its upper and lower ends, whose sides are expanded by fluids or liquids let in between it and the inclosed sides of the piston, substantially as described.

MARINUS N. ALLEN.
JOSEPH ROUSE.
JAMES MELCHER.

Witnesses as to signatures of Allen and Rouse:
    D. KENNEDY,
    B. S. MCALLISTER.
Witnesses for Melcher:
    M. M. LIVINGSTON,
    J. VAN SANTVOORD.